(12) United States Patent
Wilson

(10) Patent No.: US 6,252,695 B1
(45) Date of Patent: Jun. 26, 2001

(54) MULTIPLE WOBBLE CORRECTION OPTICAL ELEMENTS TO REDUCE HEIGHT OF RASTER OUTPUT SCANNING (ROS) SYSTEM

(75) Inventor: James M. Wilson, Glendora, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,756

(22) Filed: Dec. 20, 1999

(51) Int. Cl.[7] ........................................ G02B 26/08
(52) U.S. Cl. ........................... 359/206; 359/208; 347/259
(58) Field of Search ..................... 359/205, 206, 359/207, 208; 347/258, 259, 260, 261

(56) References Cited

U.S. PATENT DOCUMENTS

| | | | |
|---|---|---|---|
| 5,498,869 | 3/1996 | Appel et al. | 250/236 |
| 5,982,523 | * 11/1999 | Shimada et al. | 359/206 |

* cited by examiner

Primary Examiner—Darren Schuberg
(74) Attorney, Agent, or Firm—William Propp

(57) ABSTRACT

Two shorter focal length wobble correction optical elements reduce the height of a raster output scanning (ROS) system. The wobble correction optical elements can be two lenses or two mirrors.

6 Claims, 4 Drawing Sheets

FIG. 4
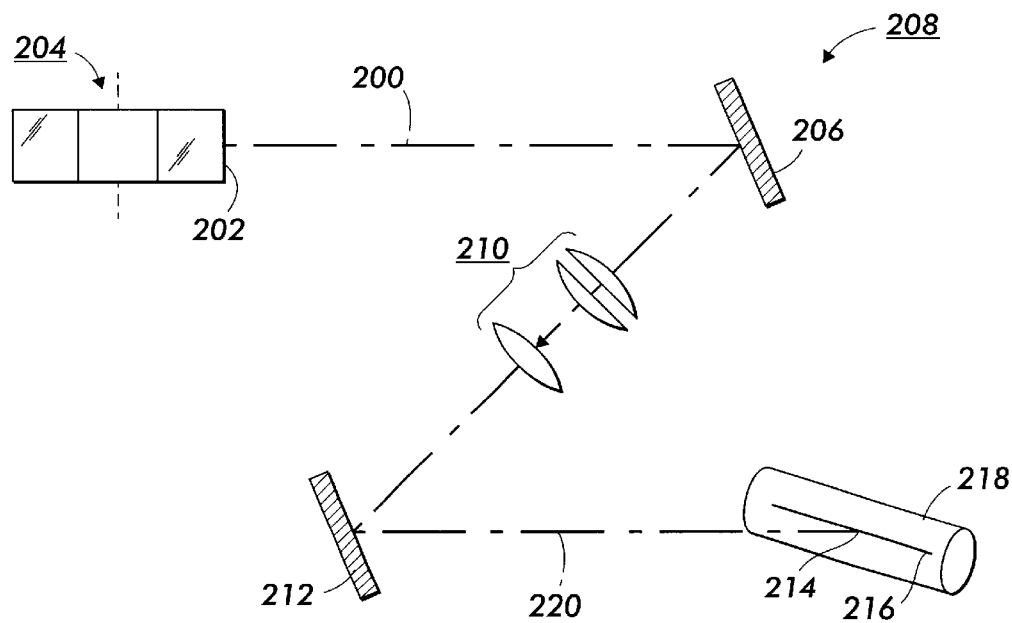
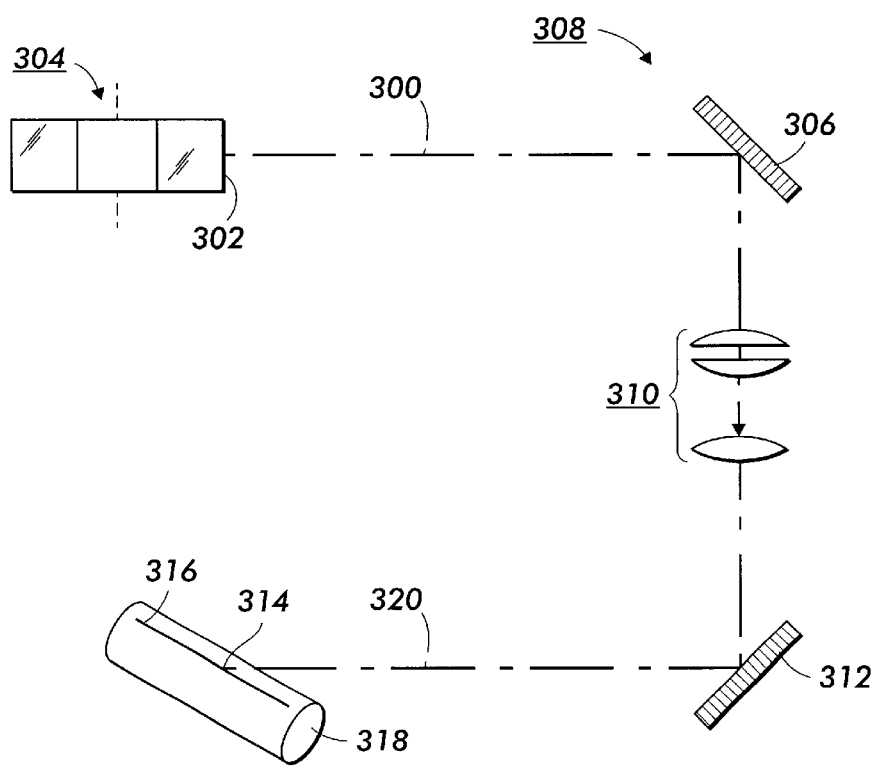
FIG. 5

MULTIPLE WOBBLE CORRECTION OPTICAL ELEMENTS TO REDUCE HEIGHT OF RASTER OUTPUT SCANNING (ROS) SYSTEM

BACKGROUND OF THE INVENTION

The present invention relates to reducing the height of a raster output scanning (ROS) system and, more particularly, to using multiple, shorter focal length, wobble correction optical elements in the raster output scanning (ROS) system to reduce the ROS height.

Printing systems utilizing lasers to reproduce information are well known in the art. The printer typically uses a Raster Output Scanner (ROS) to expose the charged portions of the photoreceptor to record an electrostatic latent image thereon. Generally, a ROS has a laser for generating a collimated beam of monochromatic light. This laser beam is modulated in conformance with an image information data stream by either an external acousto-optic modulator or by internal laser diode driver electronics. The modulated beam is transmitted through a lens onto a scanning element, typically a rotating polygon having mirrored facets.

The light beam is reflected from a facet and thereafter focused to a "spot" on the photosensitive medium. The rotation of the polygon causes the spot to scan across the photoreceptor in a scan (i.e., line scan) direction. Meanwhile, the photoreceptor is advanced relatively more slowly than the rate of the scan in a slow cross-scan direction which is orthogonal to the scan direction. In this way, the beam scans the photoreceptor recording medium in a raster scanning pattern. The light beam is intensity-modulated in accordance with the input image information serial data stream so that individual picture elements ("pixels") of the image represented by the data stream are exposed on the photoreceptor to form a latent image, which is then transferred to an appropriate image receiving medium such as paper.

While raster output scanner based printing systems are well known, implementing such printing systems that fit into a small space or on a desk is difficult. One reason is the optical cross-sectional area of the raster output scanner. This optical area must remain obstruction free so that the charged photoreceptor can be properly illuminated which limits how small the printing systems can be. Raster output scanner designs which reduce the optical cross-sectional area are exceedingly useful.

A compact design for the scanning optics of these prior art type of ROS systems is desirable to make the machine itself as compact as possible and to enable extension of the same ROS design into many machine architectures.

One well known technique to reduce the size of a ROS system is to introduce folding mirrors to fold the optical path and allow the optical components to be positioned in a more compact area.

Prior art raster output scanner based printing systems often use mirrors to fold the laser beam onto the photoreceptor. Folding is beneficial since the optical path length can remain relatively large while the physical length of the path is reduced. Reflecting the laser beam with folding mirrors prior to sweeping the laser beam with the rotating polygon mirror is relatively straightforward. Using folding mirrors after the laser beam is sweeping after reflection from the rotating polygon mirror becomes more difficult since the resulting scan line must have a direction substantially perpendicular to the motion of the photoreceptor surface.

It would be desirable to improve the efficiency, shorten the optical path lengths, and use as few optical elements as possible to decrease hardware, assembly and alignment costs in a ROS system.

A typical prior art raster output scanning system 10 of FIG. 1 consists of a pre-polygon mirror optical section 12, a rotating polygon mirror scanning element 14 comprising a plurality of reflective facets 16, and a post-polygon mirror optical section 18 to correct for wobble of the rotating polygon mirror and to focus the beam along a scan line on the photoreceptor 20.

A light source, 22, such as a laser diode, emits a modulated coherent light beam 24 of a single wavelength. The light beam 24 is modulated in conformance with the image information data stream contained in the video signal sent from image output control circuit 26 to the light source 22.

The modulated light beam 24 is collimated by a collimating lens 28 in both the scan and cross-scan planes.

The collimated light beam 24 is focused by a cross-scan cylindrical lens 30. The lens 30 is cylindrical in the cross-scan plane and piano in the scan plane. Thus, the lens converges the cross-scan portion of the beam 24 focusing it on a reflective facet 16 of the rotating polygon mirror 14 but allows the scan portion of the beam 24 to remain collimated when the beam 24 strikes the reflective facet 14.

The collimating lens 28 and the cross-scan cylinder lens 30 are usually the only optical elements in the pre-polygon mirror optical section 12.

The polygon mirror 14 is rotated around its axis of rotation by a conventional motor (not shown), known to those of ordinary skill in the art.

The beam 24 reflected from the facet 16 is still collimated in the scan plane and is now diverging in the cross-scan plane. After reflection from the reflective facet 16, the beam then passes through post-polygon optical section 18, consisting of the f-theta scan lenses 32 and the anamorphic wobble correction lens 40.

The f-theta scan lens 32 consists of a negative plano-spherical lens 34, a positive piano-spherical lens 36, and the cross-scan cylinder lens 38. This configuration of f-theta scan lenses has sufficient negative distortion to produce a linear scan beam. The light beam will be deflected at a constant angular velocity from the rotating mirror which the f-theta scan lens optically modifies to scan the surface at a constant velocity.

The f-theta scan lens 32 will focus the light beam 24 in the scan plane onto the scan line 42 on the photoreceptor 20. The f-theta scan lens 32 only has optical power in the scan plane so the f-theta scan lens 32 will not effect the divergence of the light beam 24 in the cross-scan plane.

After passing through the f-theta scan lens 32, the light beam 24 then passes through a wobble correction anamorphic lens element 40. The wobble correction optical element can be a lens or a mirror and is sometimes referred to as the "motion compensating optics". The purpose of optical element 40 is to correct wobble along the scan line generated by inaccuracies in the polygon mirror/motor assembly.

The wobble correction lens 40 focuses the light beam in the cross-scan plane onto the scan line 42 on the photoreceptor 20. The wobble correction lens 40 only has optical power in the cross-scan plane so the wobble correction lens 40 will not effect the convergence of the light beam 24 in the scan plane from the f-theta scan lens 32.

The optical path length, and consequently the overall size of a rotating polygon ROS, is largely determined by the focal lengths of the lenses used to focus the beam onto the polygon and thence onto the scan line.

As shown in FIG. 2, in the side view in the cross-scan plane, the light beam 24 is reflected from the facet 16 of the polygon mirror 14 as a point 44. The light beam 24 will then diverge at a divergence angle 46 along the optical path 48 through the f-theta scan lens 32. The f-theta scan lens 32 only has optical power in the scan plane so the f-theta scan lens 32 will not effect the divergence of the light beam 24 in the cross-scan plane. The light beam 24 will diverge until the wobble correction lens 40 which then focuses the light beam 24 at a convergence angle 50 in the cross-scan plane to a point 52 on the scan line 42 on the photoreceptor 20. The point 52 at the photoreceptor 20 is at the focal length 54 from the wobble correction optical element 40, i.e., the distance from the optical element 40 to the point 52. The light beam 24 is at its maximum height 56 in the post-polygon optics 18 at its maximum divergence along the optical path 48 at the wobble correction optical element 40.

The overall height requirement of a ROS optical system 10 is typically dependent upon the resolution and the focal length of the wobble correction optical element. In other words, working backwards from the spot 48 on the photoreceptor 20, the beam 24 converges according to the spot size until the beam reaches the wobble correction optical element 40. This convergence angle and the distance the beam travels until meeting the wobble correction optical element determines the height of the beam at the wobble correction optical element. The beam diverges from the polygon mirror to the wobble correction lens then it converges from the wobble correction lens to the photoreceptor.

It is an object of the present invention to reduce the height of a raster output scanning (ROS) optical system.

SUMMARY OF THE INVENTION

According to the present invention, two shorter focal length wobble correction optical elements reduce the height of a raster output scanning (ROS) system. The wobble correction optical elements can be two lenses or two mirrors.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a schematic illustration of the top view of the first embodiment of the wobble correction mirrors for a raster output scanning system of the present invention.

FIG. 5 is a schematic illustration of the top view of the second embodiment of the wobble correction mirrors for a raster output scanning system of the present invention.

DESCRIPTION OF THE INVENTION

Figure 3:
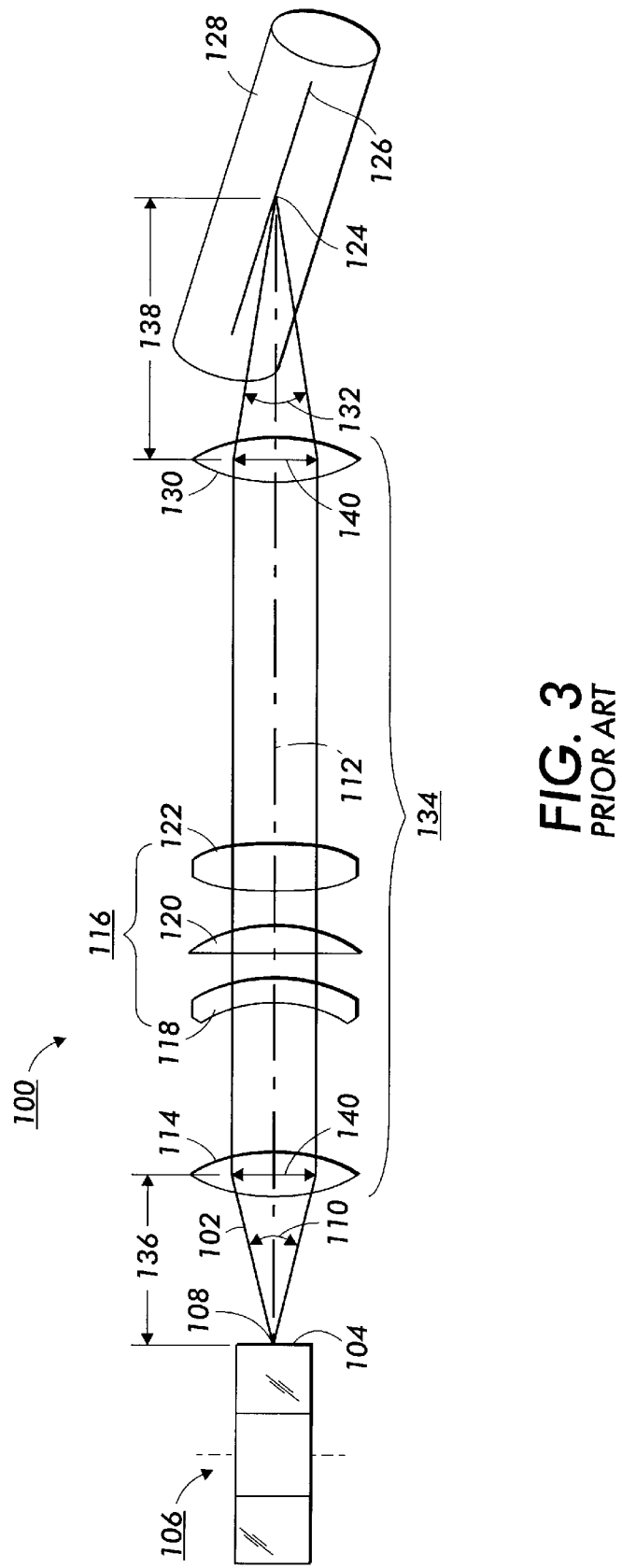
FIG. 3 is a schematic illustration of the side view of the wobble correction lenses for a raster output scanning system of the present invention.

Reference is now made to FIG. 3, wherein there is illustrated the wobble correction optical elements 100 as an embodiment of the present invention.

A light beam 102 is reflected from the facet 104 of the polygon mirror 106 as a point 108. The beam 102 reflected from the facet 104 is collimated in the scan plane and is diverging in the cross-scan plane at a divergence angle 110 along the optical path 112 to the first wobble correction lens 114 of the wobble correction optical elements 100.

The first wobble correction lens 114 will substantially collimate the light beam 102 in the cross-scan plane. The first wobble correction lens 114 only has optical power in the cross-scan plane so the wobble correction lens 114 will not effect the collimation of the light beam 102 in the scan plane from the polygon mirror facet 104.

After passing through the first wobble correction lens 114, the light beam 102 is substantially collimated in both the scan and cross-scan planes along the optical path 112 to the f-theta scan lens 116.

The f-theta scan lens 116 consists of a negative plano-spherical lens 118, a positive piano-spherical lens 120, and the cross-scan cylinder lens 122. This configuration of f-theta scan lenses has sufficient negative distortion to produce a linear scan beam.

The f-theta scan lens 116 will focus the light beam 102 in the scan plane to a point 124 on the scan line 126 on the photoreceptor 128. The f-theta scan lens 116 only has optical power in the scan plane so the f-theta scan lens 116 will not effect the substantial collimation of the light beam 102 in the cross-scan plane.

After passing through the f-theta scan lens 116, the light beam 102 then passes through the second wobble correction lens 130 of the wobble correction optical elements 100. The second wobble correction lens 130 will focus the light beam 102 in the cross-scan plane at a convergence angle 132 to a point 124 on the scan line 126 on the photoreceptor 128. The second wobble correction lens 130 only has optical power in the cross-scan plane so the wobble correction lens 130 will not effect the convergence of the light beam 102 in the scan plane from the f-theta scan lens 116.

The first wobble correction lens 114 and the second wobble correction lens 130 form the wobble correction optical elements 100 of the present invention. The f-theta scan lens 116 and the wobble correction lens 100 between the polygon mirror 106 and the photoreceptor 128 will form the post-polygon optics 134.

The point 108 on the polygon mirror 106 is at the focal length 136 of the first wobble correction lens 114, i.e., the distance from the polygon mirror to the first wobble correction lens. The point 124 at the photoreceptor 128 is at the focal length 138 from the second wobble correction optical lens 130, i.e., the distance from the second wobble correction lens to the photoreceptor.

As shown in FIG. 3, the light beam 102 is at its maximum height 140 in the post-polygon optics 134 at its maximum divergence along the optical path 112 at the first wobble correction lens 114 along its substantially collimated path and at the second wobble correction lens 130. The height of the light beam at the two wobble correction lens is significantly shorter by a factor of 2 to 4 or greater than the height of the light beam at a single wobble correction lens of the prior art. The focal lengths 130 and 132 of the two wobble correction lens are significantly shorter by a factor of 2 to 4 or greater than the focal length of a single wobble correction lens of the prior art.

The height of a given resolution, ROS optical system is substantially reduced by dividing the single wobble correction optical element into two shorter focal length elements. The f-theta scan lens is positioned in the optical path between the two wobble correction lens.

Figure 1:
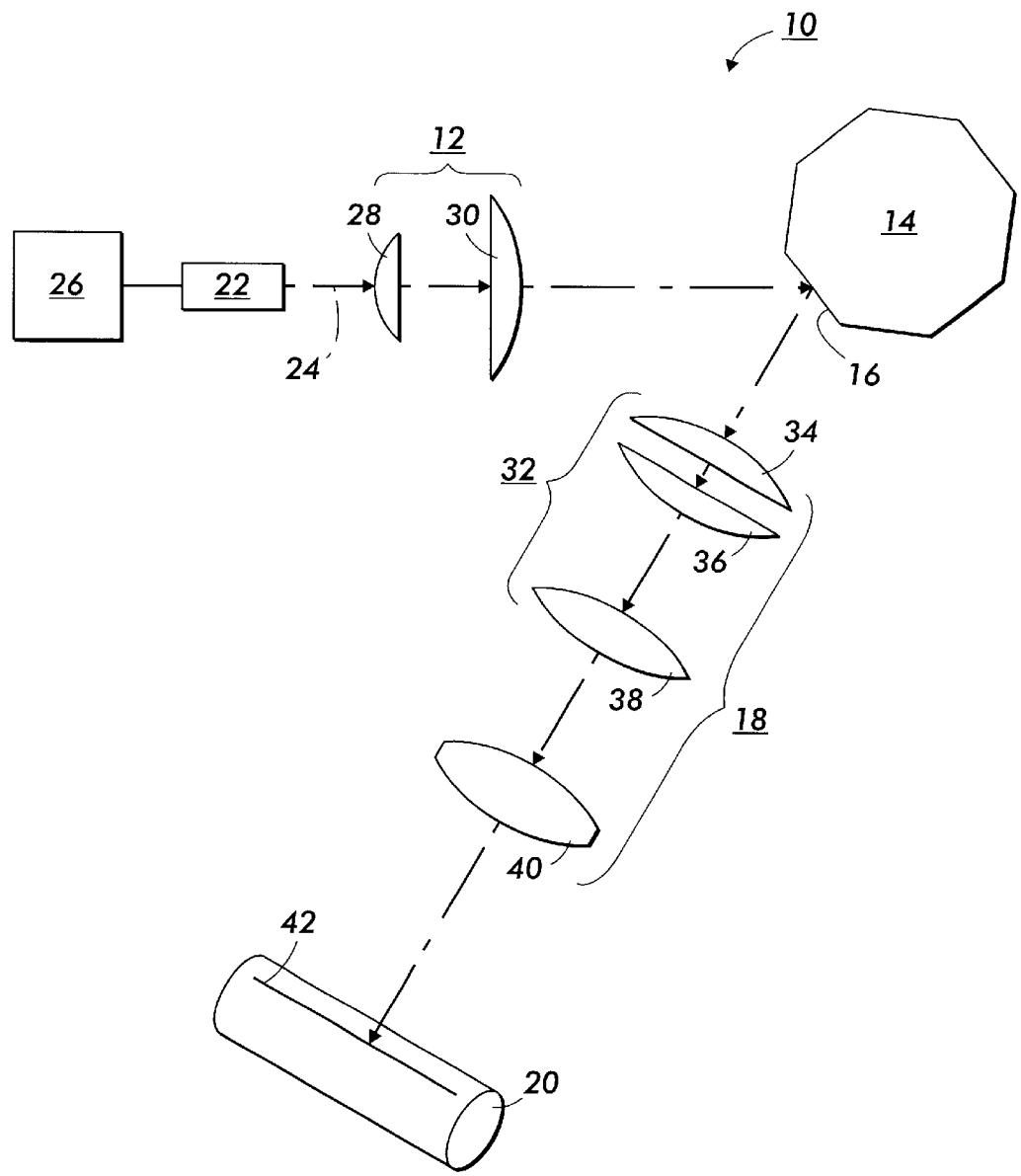
FIG. 1 is a schematic illustration of the side view of a prior art raster output scanning (ROS) optical system.
Figure 2:
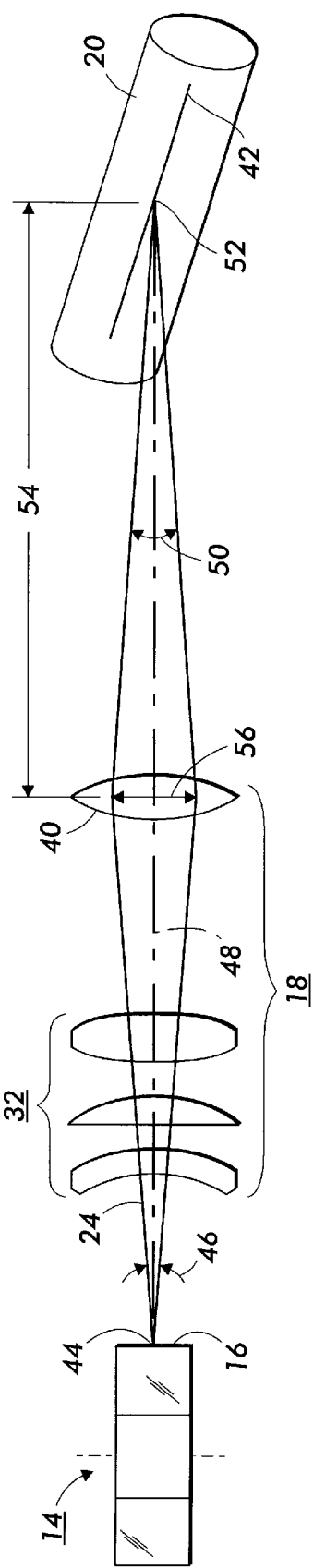
FIG. 2 is a schematic illustration of the side view showing the wobble correction lens of the prior art raster output scanning system of FIG. 1.

The light source and the pre-polygon optics are not shown in FIG. 3 for ease of understanding. The light source, the pre-polygon optics and the rotating polygon mirror of the present invention are the same as in the prior art FIG. 1. The f-theta scan lenses and the photoreceptor of the present invention are also the same as in the prior art FIG. 1. This permits the extension of the present invention into different machine architectures and permits the retrofit of the present invention into existing machine architectures.

The wobble correction optical element can also two mirrors to reduce the height of the raster output scanning optical system.

As seen in FIGS. 4 and 5, the principal distinction between the use of two transmissive lenses as the reduced height wobble correction optical element versus two reflective mirrors is that transmissive optical elements permit a straight line optical path, while reflective optical elements require an angled optical path if the ROS optical system is to retain the reduced height aspect of the invention.

As shown in FIG. 4, the light beam 200 will be reflected from a facet 202 of the rotating polygon mirror 204 to be reflected from a first wobble correction mirror 206 of the wobble correction optical elements 208. After reflection from the first wobble correction mirror 206, the light beam 200 is transmitted through the f-theta scan lens 210 to be reflected from the second wobble correction mirror 212 of the wobble correction optical elements 208. After reflection from the second wobble correction mirror 212, the light beam 200 is focused to a point 214 on the scan line 216 on the photoreceptor 218. The optical path 220 of the light beam 200 between the polygon mirror, the two wobble correction mirrors, to the photoreceptor forms a zigzag or Z pattern.

The first wobble correction mirror 206 of the wobble correction optical elements 208 of FIG. 4 will have the same optical properties as the first wobble correction lens 114 of the wobble correction optical elements 100 of FIG. 3, except for being reflective rather than transmissive. The second wobble correction mirror 212 of the wobble correction optical elements 208 of FIG. 4 will have the same optical properties as the second wobble correction lens 130 of the wobble correction optical elements 100 of FIG. 3, except for being reflective rather than transmissive. The f-theta scan lens 210 of FIG. 4 will have the same optical properties as the f-theta scan lens 116 of FIG. 3.

In FIG. 5, the light beam 300 will be reflected from a facet 302 of the rotating polygon mirror 304 to be reflected from a first wobble correction mirror 306 of the wobble correction optical elements 308. After reflection from the first wobble correction mirror 306, the light beam 300 is transmitted through the f-theta scan lens 310 to be reflected from the second wobble correction mirror 312 of the wobble correction optical elements 308. After reflection from the second wobble correction mirror 312, the light beam 300 is focused to a point 314 on the scan line 316 on the photoreceptor 318. The optical path 320 of the light beam 300 between the polygon mirror, the two wobble correction mirrors, to the photoreceptor forms a semi-circle or C pattern.

The first wobble correction mirror 306 of the wobble correction optical elements 308 of FIG. 5 will have the same optical properties as the first wobble correction lens 114 of the wobble correction optical elements 100 of FIG. 3, except for being reflective rather than transmissive. The second wobble correction mirror 312 of the wobble correction optical elements 308 of FIG. 5 will have the same optical properties as the second wobble correction lens 130 of the wobble correction optical elements 100 of FIG. 3, except for being reflective rather than transmissive. The f-theta scan lens 310 of FIG. 5 will have the same optical properties as the f-theta scan lens 116 of FIG. 3.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A raster output scanner (ROS) imaging system comprising:

a light source for generating a coherent collimated light beam output along an optical path, a photosensitive image plane, a rotatable multifaceted polygon interposed in the optical path between the light source and said photosensitive image plane for reflecting said light beam directed onto the facets of said polygon and scanning said light beam in a scan and cross-scan direction across a scan line on said photosensitive image plane, a pre-polygon optical system positioned in the optical path between said light source and said polygon, said pre-polygon optical system for focusing said light beam in the cross-scan direction onto said polygon while maintaining the collimation of the focused light beam in the scan direction onto said polygon, and a post-polygon optical system positioned in the optical path between said polygon and said photosensitive image plane, said post-polygon optical system including a first wobble correction optical element and a second wobble correction element for focusing said diverging light beam in said cross-scan direction from said polygon to a point on said photosensitive image plane, said first wobble correction element and said second wobble correction element further correcting for wobble of said light beam at said scan line on said photosensitive image plane, said first wobble correction optical element substantially collimates said diverging light beam in said cross-scan direction from said polygon, said second wobble correction optical element focuses said substantially collimated light beam in said cross-scan direction from said first wobble correction optical element to a point on said photosensitive image plane, and a f-theta scan lens focusing said substantially collimated light beam in said scan direction to a point on said photosensitive image plane, said f-theta scan lens further providing a linear scan for said light beam at said scan line on said photosensitive image plane.

2. The raster output scanner (ROS) imaging system of claim 1 wherein the f-theta scan lens is positioned between said first wobble correction optical element and said second wobble correction optical element in the optical path between said polygon and said photosensitive image plane.

3. The raster output scanner (ROS) imaging system of claim 2 wherein said first wobble correction optical element is a lens and said second wobble correction optical element is a lens.

4. The raster output scanner (ROS) imaging system of claim 2 wherein said first wobble correction optical element is a mirror and said second wobble correction optical element is a mirror.

5. The raster output scanner (ROS) imaging system of claim 1 wherein said first wobble correction optical element is a lens and said second wobble correction optical element is a lens.

6. The raster output scanner (ROS) imaging system of claim 1 wherein said first wobble correction optical element is a mirror and said second wobble correction optical element is a mirror.

* * * * *